(12) United States Patent
Zhou

(10) Patent No.: US 9,670,333 B2
(45) Date of Patent: Jun. 6, 2017

(54) COMPOSITION FOR LOW DENSITY, ULTRATHIN, AND INORGANIC FILM AND ITS PREPARATION METHOD

(71) Applicant: Xingkui Zhou, Shenzhen (CN)

(72) Inventor: Xingkui Zhou, Shenzhen (CN)

(*) Notice: Subject to any disclaimer, the term of this patent is extended or adjusted under 35 U.S.C. 154(b) by 0 days.

(21) Appl. No.: 15/015,103

(22) Filed: Feb. 3, 2016

(65) Prior Publication Data

US 2017/0002155 A1    Jan. 5, 2017

(30) Foreign Application Priority Data

Jul. 3, 2015 (CN) .......................... 2015 1 0387992

(51) Int. Cl.

| | |
|---|---|
| *C08K 3/26* | (2006.01) |
| *C08J 5/18* | (2006.01) |
| *B29C 47/00* | (2006.01) |
| *C08K 3/24* | (2006.01) |
| *C08K 5/057* | (2006.01) |
| *C08K 5/5415* | (2006.01) |
| *C08J 9/06* | (2006.01) |
| *B29K 509/00* | (2006.01) |

(52) U.S. Cl.
CPC ............ *C08K 3/26* (2013.01); *B29C 47/0021* (2013.01); *C08J 5/18* (2013.01); *C08J 9/06* (2013.01); *C08K 3/24* (2013.01); *C08K 5/057* (2013.01); *C08K 5/5415* (2013.01); *B29K 2023/06* (2013.01); *B29K 2509/00* (2013.01); *C08J 2323/06* (2013.01); *C08K 2003/265* (2013.01)

(58) Field of Classification Search
CPC .. C08J 5/18; C08J 2323/06; C08J 9/06; B29C 47/0021; C08K 13/02; C08K 3/24; C08K 3/26; C08K 5/5415; C08K 5/057; C08K 2003/265; B29K 2023/06; B29K 2509/00
See application file for complete search history.

(56) References Cited

FOREIGN PATENT DOCUMENTS

CN     101643559     *   2/2010

* cited by examiner

*Primary Examiner* — Robert Jones, Jr.
(74) *Attorney, Agent, or Firm* — Raymond Y. Chan; David and Raymond Patent Firm

(57) ABSTRACT

A composition for low density, ultrathin, and inorganic films, comprising a mixture of 70-82% of calcium carbonate by weight, 10-15% of linear polyethylene by weight, 1-5% of stearic acid by weight, 0.40-0.80% of aluminate by weight, 0.20-0.80% of titanic acid ester by weight, 0.4-3.0% of modified polyethoxylated silicone emulsion by weight, 0.05-0.5% of foaming agent by weight, and 0.01-0.1% of foaming agent accelerator by weight. The inorganic of the present invention is reduced in thickness, light in weight, easy to degrade, high tensile and high tear strength, toxicity-free, high temperature resistance, and low prices, so as to fulfill the requirement of producing the mulch, trash bags, shopping bags, and package bags.

12 Claims, 2 Drawing Sheets

| Raw Material \ Distribution | First | Second | Third | Fourth | Fifth |
|---|---|---|---|---|---|
| Calcium Carbonate | 70 | 80 | 75 | 80 | 80 |
| Linear Polyethylene | 15 | 12.5 | 10 | 15 | 13 |
| Polyethylene Wax | 2 | 1 | 2 | 0 | 2 |
| Stearic Acid | 5 | 3 | 5 | 1 | 3.2 |
| Refined Paraffin Wax | 2 | 1.5 | 3 | 1 | 0 |
| Aluminate | 0.6 | 0.4 | 0.8 | 0.4 | 0.6 |
| Titanic Acid Ester | 0.8 | 0.2 | 0.8 | 0.5 | 0.8 |
| Modified Polyethoxylated Silicone Emulsion | 3 | 1.34 | 3 | 1.5 | 0.1 |
| Foaming Agent | 0.5 | 0.05 | 0.345 | 0.5 | 0.275 |
| Foaming Agent Accelerator | 0.1 | 0.01 | 0.055 | 0.1 | 0.025 |

Fig. 1

| Name | Specific gravity (g/cm³) | Thickness (mm) | Degradation | Petrochemical products | Cost | Toxicity | Temperature resistance | Tensile strength | Tear strength |
|---|---|---|---|---|---|---|---|---|---|
| Inorganic Film | 0.88--0.95 | ≦ 0.010 | Biodegradable | ≦ 15% | 3800 $/ton | No | Good | Good | Good |
| Stone paper | 1.20--1.25 | ≧ 0.080 | Biodegradable | ≧ 25% | 5800 $/ton | No | Good | Poor | Poor |
| PE film | 0.94--0.96 | ≧ 0.005 | Ungradable | 100% | 9600 $/ton | No | Poor | Good | Good |

FIG. 2

COMPOSITION FOR LOW DENSITY, ULTRATHIN, AND INORGANIC FILM AND ITS PREPARATION METHOD

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an inorganic film, and more particularly to a low density, ultrathin, and environmentally friendly film and its preparation method, wherein the low density, ultrathin, and environmental film can be used for crop cultivation and for making shopping bags or trash bags.

Description of Related Arts

With the advancement of agricultural technology, the film technology using mulch films is widely used in the cultivation of crops, such as cotton, corns, and vegetables, wherein the application of this technology has greatly increased the crop yields and reduced the plant growth cycle thereof. As a result, the demand of the plastic film is gradually increased also. In addition, an enormous amount of plastic film are used for manufacturing shopping bags and trash bags for daily use. Generally speaking, the plastic bags are made of polyethylene (PE) film because of its higher strength. However, the PE film cannot be reused and is not degradable, such that the PE film will cause lots of pollution, such as "white pollution". An improved plastic bag is made of biodegradable films as the replacement of the PE film for solving the pollution problem. In order to ensure the film to be biodegradable, a predetermined amount of corn starch is added into the PE film to upgrade the PE film as the biodegradable film. However, molds are easy to grow in the corn starch and are less attraction for bacteria or other living organisms. The biodegradable rate of this plastic film is low.

In order to solve the technological problems of the biodegradable films, the film manufacturers use Rich Mineral Paper (RMP) or stone paper, which as a paper-like product, as a substitution of the corn starch to make the biodegradable film. In particular, a predetermined amount of calcium carbonate is added into the PE film to make this biodegradable film. However, this biodegradable film has several drawbacks. The thickness of this biodegradable film is about 0.08-3 mm. In other words, the biodegradable film is relatively thick and heavy comparing with the conventional PE film. In other words, this biodegradable film cannot be made as the ultrathin film. It is worth mentioning that the thickness of the film for the shopping bags or trash bags is about 0.006-0.02 mm. Therefore, this biodegradable film cannot be used as for making the shopping bags or trash bags.

Accordingly, a low cost, light weight, ultrathin, and highly degradable agricultural film is provided to satisfy the market needs and solve the industry's problems.

SUMMARY OF THE PRESENT INVENTION

The invention is advantageous in that it provides a composition for low density, ultrathin, and inorganic film and its preparation method to solve technology problems for current agricultural films.

According to the present invention, the foregoing and other objects and advantages are attained by a composition for low density, ultrathin, and inorganic films according to a preferred embodiment of the present invention is illustrated, wherein the composition comprises a mixture of 70-82% of calcium carbonate by weight, 10-15% of linear polyethylene by weight, 0-2% of polyethylene wax by weight, 1-5% of stearic acid by weight, 0-3% of refined paraffin wax by weight, 0.40-0.80% of aluminate by weight, 0.20-0.80% of titanic acid ester by weight, 0.4-3.0% of modified polyethoxylated silicone emulsion by weight, 0.05-0.5% of foaming agent by weight, and 0.01-0.1% of foaming agent accelerator by weight.

In accordance with another aspect of the invention, the present invention comprises a preparation method for a ultra-thin inorganic and low density film, comprising the following steps.

Step 1: Preparation Method for Inorganic Grains:

According to the weight percentage of the composition for low density, ultrathin, and inorganic film, the calcium carbonate, linear polyethylene and polyethylene wax are mixed into the mixer to form a first mixture; and the temperature of the first mixture is increased to the temperature about 80° C. to 130° C., then the stearic acid is added into the mixer to mix with the first mixture for 10 minutes to form a second mixture; and aluminate and titanic acid ester are added into the mixer to mix with the second mixture for 10 minutes to form a third mixture; the foaming agent, foaming agent accelerator and modified polyethoxylated silicone emulsion are added into the mixer to mix with the third mixture for 10 minutes to form a fourth mixture; the refined paraffin wax is added into the mixer to cool down the temperature of the fourth mixture to form an inorganic mixture. The mixture is placed into a double shaft extruder under a 12-section heating process until the temperature of the mixture reaches at 210° C. Then, inorganic grain is extruded and produced by the double shaft extruder.

Accordingly, the granularity of the calcium carbonate is between 1 to 3 micron, wherein 12-section heating process gradually heats up the mixture with the followings temperature: 155° C., 155° C., 210° C., 155° C., 155° C., 210° C., 155° C., 155° C., 210° C., 155° C., 155° C. in sequence, and until the temperature reaches to 210° C. finally.

Step 2: Preparation Method for Film Blowing.

The above inorganic grains are mixed with a high or low density of PE into a film blowing machine to form a film mixture, and the temperature of the film mixture is increased until 130° C. to 145° C. When the density of the film mixture is determined between 0.80 g to 0.95 g/cm$^3$, then a low density, ultra-thin, inorganic film is produced by the film blowing machine that the thickness of the low density, ultra-thin, inorganic film between 0.006 to 0.010 mm.

The proportion of the inorganic grains and the high or low density PE is 90:10, 80:20, 30:70, or 60:40 by weight.

The aluminum acid ester, titanate coupling agent, and foaming agents (for releasing gaseous substances), foaming agent accelerator, and modified polyethoxylated silicone gas molecules are adapted to change the internal order of the gas molecules absorbed on the surface of the calcium carbonate, so the order between the gas bubbles of foaming agent are orderly arranged in a nano-level arrangement on the surface of activated calcium carbonate. The activated calcium carbonate has improved pressure-resilience, stable in structure, certain elasticity and recovery. The nano-sized gas molecule absorbed on the surface of the calcium carbonate will not be damaged during the process of adding PE under the high temperature and the film blowing process, and then reach the goal of reducing the density of finished products. When the density of the film mixture is reduced to the density between 0.80 and 0.95 g/cm$^3$, the nano-sized gas molecule absorbed on the surface of the calcium carbonate has strong strength and flexibility during the film blowing process, so that even the temperature reaches 130 to 145 degrees, the nano-sized gas molecule absorbed on the surface of the calcium carbonate will not be damaged. Therefore, the inorganic film having low density between 0.006 and 0.010 mm is highly fulfill the requirement of producing the mulch, trash bags, shopping bags, package bags.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 1 is a Table showing a weight percentage of the composition for low density, ultrathin, and inorganic film according to a preferred embodiment of the present invention.

FIG. 2 is a table showing a comparison among the inorganic film of the present invention, the conventional Rich Mineral Paper, and the conventional PE film.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 of the drawings, a composition for a low density, ultrathin, and inorganic film according to a preferred embodiment of the present invention is illustrated, wherein the composition comprises calcium carbonate 70-82% by weight, linear polyethylene 10-15% by weight, polyethylene wax 0-2% by weight, stearic acid 1-5% by weight, refined paraffin wax 0-3% by weight, aluminate 0.40-0.80% by weight, titanic acid ester 0.20-0.80% by weight, modified polyethoxylated silicone emulsion 0.1-3.00% by weight, foaming agent 0.05-0.5% by weight, and foaming agent accelerator 0.01-0.1% by weight, wherein the granularity of the calcium carbonate is about 1-3 micron, and the modified polyethoxylated silicone emulsion contains 70% of modified polythoxylated silicone.

According to different customers' needs, the weight percentage of the composition for the low density, ultrathin, and inorganic film is variable. The weight percentages of the composition are shown in FIG. 1.

The density of calcium carbonate is between 2.4 and 2.6 g/cm$^3$. The density of PE film is between 0.91 and 0.94 g/cm$^3$. The specific weight of the Rich Mineral Paper is between 1.10 and 1.25 g/cm$^3$. In other words, the specific weight of the Rich Mineral Paper is not an average value of the density of the calcium carbonate and the density of the PE. In fact, the specific weight of the Rich Mineral Paper is significantly less than the average value of the density of the calcium carbonate and the density of PE. It is worth mentioning that during the activating process of the calcium carbonate and the mixing process of PE, clearances will be formed on the rich mineral paper, and gas molecules are filled into the clearances, such that the specific weight of the rich mineral paper is significantly lesser than the average density of the calcium carbonate and the weight of PE. Therefore, the present invention provides an activation process of the calcium carbonate and mixing process of the PE to form a preparation method for mixing the calcium carbonate and LLPE together by adding activating additives in order to form a low density and ultrathin film.

The preparation method for a ultra-thin, inorganic, and low density film, comprises the following steps.

Step 1: Preparation Method for Inorganic Grains:

According to the weight percentage of the composition for low density, ultrathin, and inorganic film, the calcium carbonate, linear polyethylene and polyethylene wax are mixed into the mixer to form a first mixture; and the temperature of the first mixture is increased to the temperature about 80° C. to 130° C., then the stearic acid is added into the mixer to mix with the first mixture for 10 minutes to form a second mixture; and aluminate and titanic acid ester are added into the mixer to mix with the second mixture for 10 minutes to form a third mixture; the foaming agent, foaming agent accelerator and modified polyethoxylated silicone emulsion are added into the mixer to mix with the third mixture for 10 minutes to form a fourth mixture; the refined paraffin wax is added into the mixer to cool down the temperature of the fourth mixture to form an inorganic mixture. The mixture is placed into a double shaft extruder under a 12-section heating process until the temperature of the mixture reaches at 210° C. Then, inorganic grain is extruded and produced by the double shaft extruder. Accordingly, the granularity of the calcium carbonate is between 1 to 3 micron, wherein 12-section heating process gradually heats up the mixture with the followings temperature: 155° C. , 155° C., 210° C., 155° C. , 155° C., 210° C., 155° C., 155° C., 210° C., 155° C., 155° C. in sequence, and until the temperature reaches to 210° C. finally.

Step 2: Preparation Method for Film Blowing.

The above inorganic grains are mixed with a high or low density of PE into a film blowing machine to form a film mixture, and the temperature of the film mixture is increased until 130° C. to 145° C. When the density of the film mixture is determined between 0.80 g to 0.95 g/cm$^3$, then a low density, ultra-thin, inorganic film is produced by the film blowing machine that the thickness of the low density, ultra-thin, inorganic film between 0.006 to 0.010 mm.

The proportion of the inorganic grains and the high or low density PE is 90:10, 80:20, 30:70, or 60:40 by weight.

In order to maximize the gas molecules to be absorbed on the surface of the activated inorganic powders-calcium carbonate, the aluminum acid ester and titanate coupling agent are adapted to stabilize the property of the activated inorganic powders. Chemical reaction and physical reaction are generated on the surface of the activated inorganic powders to a surface organic molecular layer, so that surface property of the inorganic powder can be changed from hydrophilic to lipophilic, and an inorganophilic end and an organophilic end of the aluminum acid ester and titanium acid ester respectively are chemically reacted with the surfaces of inorganic powders and the organic surfaces of polyolefin. Then a physical blinding structure is produced on the surfaces of the polyodfin, so that a compatibility between the inorganic powder system and organic polyolefin interface is improved. Aluminate ester and titanate coupling agent are applied to change the usage of inorganic powders, and are well-mixed with polyolefin to form homogeneous products.

A major way to decrease a density of the inorganic film is to allow more stable gas molecules to be absorbed on the surfaces of the activated inorganic powders. The water molecule is unstable and cannot be used to decrease the density of the products. Water needs to be removed in the film mixture between the inorganic powders and polytene under the heating process. In order to produce the gas molecules, a small amount of environmental protection foaming agent is used, such as OBSH foaming agents, and the chemical name thereof is: 4,4-oxydibenzenesulfonyl hydrazide. The decomposition temperature of the foaming agent is between 140° C. and 160° C., and the evolved gas amount is 145 ml/g, and the foaming agent is nontoxic, odorless, no pollution, and no residual ammonia retained.

The inorganic powder of calcium carbonate has a particles of 1 to 3 micro, which is ultra-fine powder with a good dispersibility. And, the foaming agent accelerator, such as Korea CX-A surface treatment urea, is added into the OBSH to reduce the decomposition temperature thereof, and the decomposition temperature is between 120° C. and 130° C. The change of the decomposition rate is smooth without sudden gas releasing. And, the gas released from the foaming agents is easily absorbed on the surface of the inorganic powder, so as to generate high density of micro-molecular gas bubbles, while the bubble walls are thin but sturdy, elastic, compressive-resistance, and easy to recover.

In order to activate the inorganic powders—Calcium carbonate and polyolefin products have a very low density, and the gas molecules absorbed on the surfaces of inorganic powders and the gas molecules wrapped between polyolefin are stably maintained within the finished product.

Modified polyethoxylated silicone is adapted to be a foam stabilizer to ensure the stability of an inorganic, low density, and thin film technology. Gas molecules absorbed on the surface of inorganic powder and the gas molecules wrapped between polyolefin are stably retained on the surface thereof and wrapped therebetween during the production processes, such as dispersion, mixing, extruded and blowing film, in order to produce an ideal low density of inorganic membrane. Modified polyethoxylated silicone is very important in the preparation process. If no modified polyethoxylated silicone is added, the gas molecules absorbed on the surface of inorganic powder and wrapped between polyolefin cannot be stably retained on the surface thereof and wrapped therebetween during the production process. Principles of the modified polyethoxylated silicone is to change the arrangement of surface molecules of the inorganic powder and polyolefin, so as to force the surfaces between gas molecules to be closely arranged. A dense inner layer of film is generated. The surface of the inorganic powder and polyolefin have strong pressure-resistant, and the structure of gas molecule structure is stable, so the active molecules of the surface of the inorganic powder are orderly arranged on the gas membranes of the gas molecules. Therefore, the gas molecules have good flexibility and self-healing capabilities, so as to achieve the desired special foam stabilizing role. This is how the modified polyethoxylated silicone solve the instability of the gas molecules, and it is also an outstanding contribution for modified polyethoxylated silicone in the production process of low density, inorganic, ultra-thin film. Modified polyethoxylated silicone is adapted to improve the gas molecules absorbed on the inorganic powder, and the order of the gas molecules are stable, elastic, heat-resistance, and pressure-resistance, and then the oxygen content for the mixture of the modified polyethoxylated silicone and the organic polyolefin resin is increased, so the oxygen molecules are stably retained on the surface of inorganic powder and wrapped between polyolefin during the production process to decrease the density thereof.

The aluminum acid ester, titanate coupling agent, and foaming agents (for releasing gaseous substances), foaming agent accelerator, and modified polyethoxylated silicone gas molecules are adapted to change the internal order of the gas molecules absorbed on the surface of inorganic powder and the gas molecules wrapped between polyolefin, so the order between the gas bubbles of foaming agent are orderly arranged in a Nano-level arrangement on the surface of activated calcium carbonate, so the activated calcium carbonate has improved pressure-resilience, stable in structure, certain elasticity and recovery. The nano-sized gas molecule absorbed on the surface of the calcium carbonate will not be damaged during the process of adding PE under the high temperature and the film blowing process, and then reach the goal of reducing the density of finished products. When the density of the film mixture is reduced to the density between 0.80 to 0.95 g/cm$^3$, the nano-sized gas molecule absorbed on the surface of the calcium carbonate has strong strength and flexibility during the film blowing process. So, even the temperature reaches 130° C. to 145° C., the nano-sized gas molecule absorbed on the surface of the calcium carbonate will not be damaged. The inorganic film having low density between 0.006 and 0.010 mm are highly fulfill the requirement of producing the mulch, garbage bags, shopping bags, package bags.

FIG. 2 is a relative performance indicating table for the inorganic film, existing Rich Mineral Paper and PE film.

According to FIG. 2, the inorganic thin film of the present invention has reduced thickness, is light in weight, is easy to degrade, has high tensile and high tear strength, toxicity-free, high temperature resistance, and low prices, so as to fulfill the requirement of producing the mulch, trash bags, shopping bags, package bags.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A composition for inorganic films, comprising a mixture of 70-82% of calcium carbonate by weight, 10-15% of linear polyethylene by weight, 1-5% of stearic acid by weight, 0.40-0.80% of aluminate by weight, 0.20-0.80% of titanic acid ester by weight, 0.4-3.0% of modified polyethoxylated silicone emulsion by weight, 0.05-0.5% of foaming agent by weight, and 0.01-0.1% of foaming agent accelerator by weight.

2. The composition, as recited in claim 1, wherein a granularity of said calcium carbonate is 1-3 micron.

3. The composition, as recited in claim 1, wherein said modified polyethoxylated silicone emulsion has 70% of modified polyethoxylated silicone.

4. The composition, as recited in claim 2, wherein said modified polyethoxylated silicone emulsion has 70% of modified polyethoxylated silicone.

5. The composition, as recited in claim 1, further comprising not more than 2% of polyethylene wax by weight and not more than 3% of refined paraffin wax by weight.

6. The composition, as recited in claim 4, further comprising not more than 2% of polyethylene wax by weight and not more than 3% of refined paraffin wax by weight.

7. The composition, as recited in claim 1, wherein said foaming agents is 4,4-oxydibenzenesulfonyl hydrazide.

8. The composition, as recited in claim 6, wherein said foaming agents is 4,4-oxydibenzenesulfonyl hydrazide.

9. The composition, as recited in claim 1, wherein said foaming agent accelerator is a surface treatment urea.

10. The composition, as recited in claim 8, wherein said foaming agent accelerator is a surface treatment urea.

11. The composition, as recited in claim 1, wherein said calcium carbonate is in powdered form, wherein gas molecules are absorbed on surfaces of the powdered calcium carbonate.

12. The composition, as recited in claim 10, wherein said calcium carbonate is in powdered form, wherein gas molecules are absorbed on surfaces of the powdered calcium carbonate.

* * * * *